United States Patent
Yamamoto et al.

[11] 3,895,395
[45] July 15, 1975

[54] QUINAZOLINE COMPOUNDS

[75] Inventors: Michihiro Yamamoto, Nishinomiya; Shigeaki Morooka; Masao Koshiba, both of Takarazuka; Shigeho Inaba, Takarazuka; Hisao Yamamoto, Nishinomiya, all of Japan

[73] Assignee: Sumitomo Chemical Co., Ltd., Osaka, Japan

[22] Filed: July 3, 1973

[21] Appl. No.: 376,163

[30] Foreign Application Priority Data
July 24, 1972 Japan.............................. 47-74460

[52] U.S. Cl....260/251 QB; 260/247.1; 260/247.2 B; 260/256.4 Q; 260/256.5 R; 424/251
[51] Int. Cl............................................. C07d 51/48
[58] Field of Search...260/251 QB, 256.4 Q, 256.5 R

[56] References Cited
UNITED STATES PATENTS

| | | | |
|---|---|---|---|
| 3,712,892 | 1/1973 | Inaba et al.................... | 260/251 QB |
| 3,748,331 | 7/1973 | Cooke et al.................. | 260/251 QB |
| 3,812,118 | 5/1974 | Yamamoto et al........ | 260/251 QB X |

*Primary Examiner*—Robert Gerstl
*Assistant Examiner*—Richard L. Raymond
*Attorney, Agent, or Firm*—Stevens, Davis, Miller & Mosher

[57] ABSTRACT

Novel 2(1H)-quinazolinone derivatives having a group of the formual —A—Q—CO—R, wherein R is a lower alkyl, lower alkenyl, aralkyl, lower haloalkyl, lower alkoxyalkyl, lower hydroxyalkyl, lower mercaptoalkyl, cycloalkyl, lower cycloalkylalkyl group or a group of the formula

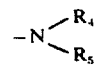

(wherein $R_4$ and $R_5$ are independently a hydrogen atom or a lower alkyl group, provided that $R_4$ and $R_5$ may form together with the adjacent nitorgen atom a 5- or 6- membered saturated heterocyclic ring, which may further contain a nitrogen or oxygen atom); Q is an oxygen or sulfur atom; and A is a lower alkylene group, at the 1-position of a quinazoline ring; are prepared by (*a*) reacting a 2(1H)-quinazolinone derivative having a hydrogen atom at the 1-position with a reactive ester of an alcohol of the formula R—CO—Q—A—OH, (*b*) reacting a 2-aminophenylketone derivative with cyanic acid or a salt thereof or a reactive ester of carbamic acid, (*c*) reacting a trihalogenoacetamideophenylketone derivative with ammonia, (*d*) reacting a 2-aminophenylketimine with a carbonic acid derivative, (*e*) reacting a 2(1H)-quinazolinone derivative having a A— QH group at the 1-position with a carboxylic acid of the formula R—COOH or a reactive derivative thereof, (*f*) reacting a reactive ester of a 2(1H)-quinazolinone derivative having a A—OH group at the 1-position with a carboxylic acid derivative of the formula R—CO—QH or a salt thereof, or (*g*) oxidizing a 3,4-dihydro-2(1H)-quinazolinone derivative having a group of the formula —A—Q—CO—R at the 1-position. These quinazolinone derivatives are useful as uricosuric, anti-inflammatory and/or analgesic agents.

11 Claims, No Drawings

QUINAZOLINE COMPOUNDS

This invention relates to novel quinazolinone derivatives and a process for production thereof.

More particularly, this invention relates to quinazolinone derivatives of the formula,

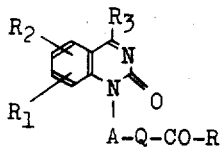

[I]

wherein $R_1$ and $R_2$ are independently a hydrogen atom, a halogen atom, a lower alkyl group, a lower alkoxy group, a nitro group, a trifluoromethyl group, a cyano group, a lower alkoxycarbonyl group, a lower alkylthio group or a lower alkylsulfonyl group, or $R_1$ represents 6,7-methylenedioxy group together with $R_2$; $R_3$ is a phenyl group, a halophenyl group, a lower alkaylphenyl group, a lower alkoxyphenyl group, a nitrophenyl group, a cycloalkyl group, a pyridyl group, a thienyl group or a furyl group; R is a lower alkyl group, a lower alkenyl group, an aralkyl group, a lower haloalkyl group, a lower alkoxyalkyl group, a lower hydroxyalkyl group, a lower mercaptoalkyl group, a cycloalkyl group or a lower cycloalkylalkyl group or a group of the formula

(wherein $R_4$ and $R_5$ are independently a hydrogen atom or a lower alkyl group, provided that $R_4$ and $R_5$ may form together with the adjacent nitrogen atom a 5- or 6-membered saturated heterocyclic ring, which may further contain a nitrogen or oxygen atom; Q is an oxygen atom or a sulfur atom; and A is a lower alkylene group, and a process for production and pharmaceutical use of the same.

In the compounds of the above formula [I], the term "halogen" includes all halogen atoms, i.e. fluorine, chlorine, bromine and iodine; the term "alkyl" means both straight and branched chain aliphatic hydrocarbon radicals, and the lower alkyl is $C_{1-4}$ alkyl which includes, for example, methyl, ethyl, n-propyl, isopropyl, n-butyl, isobutyl or tertiary-butyl; the term "lower alkoxy" is $C_{1-4}$ alkoxy which includes, for example, methoxy, ethoxy, n-propoxy, isopropoxy, n-butoxy, isobutoxy or tertiary-butoxy; the term "cycloalkyl" is $C_{3-6}$ cycloalkyl which includes, for example, cyclopropyl, cyclobutyl, cyclopentyl or cyclohexyl; the term "lower alkenyl" is $C_{2-5}$ alkenyl which includes, for example, vinyl, allyl, propenyl, isopropenyl, methallyl, 1-methylpropenyl, or 2-methylpropenyl; the term "aralkyl" is, for example, benzyl, phenethyl, α-methylbenzyl and the like; the term "lower haloalkyl" is 1-5 halogen atoms substituted $C_{1-4}$ alkyl which includes, for example, chloromethyl, bromomethyl, fluoromethyl, dichloromethyl, difluoromethyl, trichloromethyl, trifluoromethyl, 1-chloroethyl, 2-chloroethyl and pentafluoroethyl; the term "lower alkoxyalkyl" is ($C_{1-4}$ alkoxy)$C_{1-4}$ alkyl which includes, for example, methoxymethyl, ethoxymethyl, 2-ethoxyethyl and the like; the term "lower hydroxyalkyl" is hydroxy $C_{1-4}$ alkyl which includes, for example, hydroxy methyl, 2-hydroxyethyl, 2-hydroxy-2-propyl and the like; the term "lower mercaptoalkyl" is mercapto $C_{1-4}$ alkyl which includes, for example, mercaptomethyl, 1-mercaptoethyl, 2-mercaptoethyl and the like; the term "lower alkoxycarbonyl" is $C_{1-4}$ alkoxycarbonyl in which the $C_{1-4}$ alkoxy moiety is as mentioned above; the term "lower alkylthio" is $C_{1-4}$ alkylthio which includes, for example, methylthio, ethylthio, propylthio and butylthio; the term "lower alkylsulfonyl" is $C_{1-4}$ alkylsulfonyl which includes, for example, methylsulfonyl, ethylsulfonyl, propylsulfonyl and the like; the term "lower alkylphenyl" is o-, m- or p-$C_{1-4}$ alkylphenyl in which the $C_{1-4}$ alkyl moiety is as mentioned above; the term "lower alkoxyphenyl" is o-, m- or p-$C_{1-4}$ alkoxyphenyl in which the $C_{1-4}$ alkoxy moiety is as mentioned above; the term "lower cycloalkylalkyl" is ($C_{3-6}$ cycloalkyl)$C_{1-4}$ alkyl in which both moieties are as mentioned above; and the lower alkylene in the symbol A is straight or branched $C_{1-5}$ alkylene which includes, for example, methylene, ethylene, trimethylene, 1-methylethylene, 2-methylethylene, 2-methyltrimethylene and 2-ethyltrimethylene.

The quinazolinone derivatives of the formula [I], which have not been described in any literature, have excellent pharmacological activities such as uricosuric, anti-inflammatory and/or analgesic activities with low toxicities which render them useful as synthetic medicinals. Illustratively, 1-(2-acetoxyethyl)-4-phenyl-6-nitro-2(1H)-quinazolinone shows remarkable inhibitory action for carrageenin-induced edema in rat, while no toxic symptoms are observed and occult bleeding is negative in feces after oral administration of 1500 mg/kg in rat. Moreover, this compound possesses more potent uricosuric activity than the known drugs such as p-(dipropylsulfamoyl)benzoic acid (probenecid).

Accordingly, an object of the present invention is to provide novel quinazolinone derivatives of the formula [I] which have excellent pharmacological properties. Another object of the present invention is to provide a process for producing such novel and useful quinazolinone derivatives. A further object of the present invention is to provide a pharmaceutical composition containing one or more quinazolinone derivatives of the formula [I], and a pharmaceutically acceptable diluent or carrier. Other objects and merits of the present invention will be apparent from the following descriptions.

According to the present invention, the novel quinazolinone derivatives of the formula [I] can be prepared by a variety of methods, which comprise a. reacting a compound of the formula,

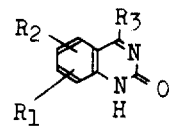

[II]

wherein $R_1$, $R_2$ and $R_3$ are as defined above, with a reactive ester of an alcohol of the formula,

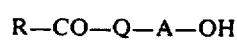

[III]

wherein R, Q and A are as defined above, b. reacting a compound of the formula,

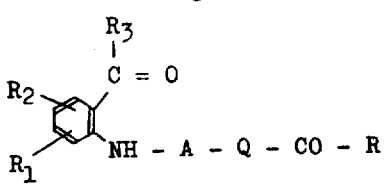

wherein $R_1$, $R_2$, $R_3$, R, Q and A are as defined above, with cyanic acid or a salt thereof or a reactive ester of carbamic acid, c. reacting a compound of the formula,

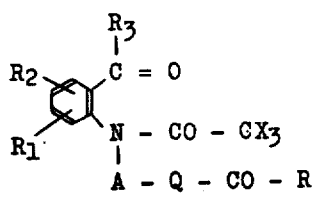

wherein $R_1$, $R_2$, $R_3$, R, Q and A are as defined above and X is a halogen atom, with ammonia, d. reacting a compound of the formula,

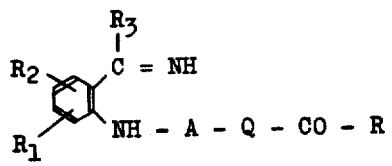

wherein $R_1$, $R_2$, $R_3$, R, Q and A are as defined above, with a carbonic acid derivative of the formula, $$Y-CO-Z \quad [VII]$$

wherein Y and Z are independently a chlorine atom, a lower alkoxy group, a benzyloxy group, a lower alkylthio group, a trichloromethyl group or a 1-imidazolyl group, e. reacting a compound of the formula,

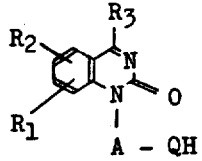

wherein $R_1$, $R_2$, $R_3$, Q and A are as defined above, with a carboxylic acid of the formula, $$R-COOH \quad [IX]$$

wherein R is as defined above, or a reactive derivative thereof, f. reacting a reactive ester of an alcohol of the formula,

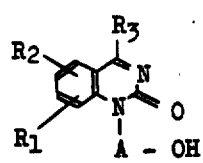

wherein $R_1$, $R_2$, $R_3$ and A are as defined above, with carboxylic acid derivative of the formula, $$R-CO-OH \quad [XI]$$

wherein R and Q are as defined above, or a salt thereof, and g. oxidizing a compound of the formula,

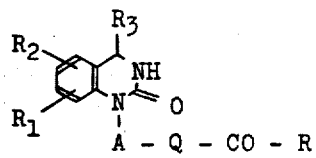

wherein $R_1$, $R_2$, $R_3$, R, Q and A are as defined above.

The above-mentioned methods of the present invention will be explained in detail below.

In the method (a), a compound of the formula [II] is reacted with a reactive ester of an alcohol of the formula [III] in an inert organic solvent in the presence of a basic condensing agent, or a salt prepared by reacting a compound of the formula [II] with a basic condensing agent in an inert organic solvent, is reacted with a reactive ester of an alcohol of the formula [III] in an inert organic solvent, to yield a quinazolinone derivative of the formula [I].

As the reactive ester of an alcohol of the formula [III], there may be preferably used a halide such as chloride, bromide or iodide or a sulfonic acid ester such as methanesulfonic acid ester, trichloromethanesulfonic acid ester or p-toluenesulfonic acid ester.

Preferable basic condensing agents include, for example, sodium hydride, potassium hydride, sodium amide, potassium amide, butyllithium, phenyllithium, sodium methylate, sodium ethylate and potassium ethylate.

Suitable inert solvents include, for example, benzene, toluene, xylene, monochlorobenzene, dimethyl acetamide, diethyl acetamide, dimethyl formamide, ether, tetrahydrofuran, dioxane, dimethylsulfoxide, and a mixture thereof.

The reaction is generally effected at a temperature within the range of from room temperature to the boiling point of the solvent depending on the kinds of a reactive ester of the alcohol and a solvent used.

Since the compound of the formula [II] forms tautomers of keto and enol forms, the reaction may be acccompanied by formation of quinazoline derivative of the formula,

wherein $R_1$, $R_2$, $R_3$, R, Q and A are as defined above. The desired compound of the formula [I] can be easily separated by using a conventional method such as fractional crystallization or chromatography.

In the method (b), a compound of the formula [IV] is reacted with cyanic acid or a salt thereof in an acidic solvent such as acetic acid or the like, or a compound of the formula [IV] is reacted with a reactive ester of carbamic acid in the presence of a Lewis acid such as zinc chloride or the like with heating preferably at a temperature of from 160°C to 180°C, to yield a quinazolinone derivative of the formula [I].

Examples of the salt of cyanic acid include sodiudm cyanate and potassium cyanate.

Examples of the reactive ester of carbamic acid include carbamyl chloride, methyl carbamate, ethyl carbamate and benzyl carbamate.

In the method (c), a compound of the formula [V] is reacted with ammonia, preferably in the presence of a solvent.

Suitable solvents include, for example, methanol, ethanol, isopropnaol, tertiary-butanol, 2-ethoxyethanol, tetrahydrofuran, dioxane, benzene, toluene, acetone, acetonitrile, pyridine, dimethyl sulfoxide, dimethyl formamide, and a mixture thereof.

Ammonia is added to the reaction mixture as gaseous or liquid ammonia, or as alcoholic ammonia such as methanolic ammonia, ethanolic ammonia and the like, or ammonium salts such as ammonium acetate, ammonium formate, ammonium succinate, ammonium carbamate, ammonium carbonate, ammonium phosphate and the like.

The reaction can easily proceed at room temperature, but, if necessary, higher temperature may be employed satisfactorily.

In the method (d), a compound of the formula [VI] is reacted with a carbonic acid derivative of the formula [VII], preferably in the presence of an inert solvent and a basic condensing agent, to yield a quinazolinone derivative of the formula [I].

As the carbonic acid derivative, there may be preferably used phosgene, methyl chlorocarbonate, ethyl chlorocarbonate, isopropyl chlorocarbonate, benzyl chlorocarbonate, ethyl chlorothiolformate, trichloroacetyl chloride, hexachloroacetone, 1,1'-carbonyldiimidazole and the like.

Suitable solvents include, for example, benzene, toluene, xylene, chlorobenzene, pyridine, ether, isopropyl ether, tetrahydrofuran, dioxane, chloroform, dichloroethane and dimethyl formamide.

Suitable basic condensing agents include inorganic bases such as sodium carbonate, potassium carbonate, sodium hydroxide and the like, and tertiary amines such as triethylamine, dimethylaniline, pyridine and the like.

The reaction can be effected with cooling or heating, depending upon the kinds of a carbonic acid derivative employed.

In the method (e), a compound of the formula [VIII] is reacted with a carboxylic acid of the formula [IX] or a reactive derivative thereof to yield a quinazolinone derivative of the formula [I].

As the reactive derivative of the carboxylic acid, there may be preferably used an acid halide, an acid anhydride or an ester. The acid halide includes, for example, the chloride, bromide and iodide of the carboxylic acid of the formula [IX]. The acid anhydride may include mixed acid anhydrides, which can, for example, be prepared by reacting the carboxylic acid with an alkyl chlorocarbonate such as methyl chlorocarbonate, ethyl chlorocarbonate, or trifluoroacetic anhydride.

As the ester of the carboxylic acid of the formula [IX] there may, for example, be used isopropenyl ester of the carboxylic acid.

The reaction of this method is preferably carried out in an inert solvent in the presence or absence of a basic condensing agent or an accelerator.

The inert solvent employed is selected from the group consisting of benzene, toluene, chlorobenzene, methylene chloride, chloroform, ether, tetrahydrofuran, dimethyl formamide, pyridine, water and the like, depending upon the kinds of a carboxylic acid of the formula [IX] or a reactive derivative thereof.

Examples of the basic condensing agent include, sodium hydroxide, potassium hydroxide, sodium carbonate, potassium carbonate, sodium methylate, sodium ethylate, triethylamine, dimethylaniline and pyridine.

Examples of the accelerator for the reaction include, sulfuric acid, hydrochloric acid, p-toluenesulfonic acid, boron trifluoride etherate, magnesium, zinc chloride, sodium acetate and potassium acetate.

In the method (f), a reactive ester of an alcohol of the formula [X] is reacted with a carboxylic acid derivative of the formula [XI] or a salt thereof in an inert organic solvent, to yield a quinazolinone derivative of the formula [I].

As the reactive ester of an alcohol of the formula [X], there may preferably be used a halide such as chloride, bromide or iodide, or a sulfonic acid ester such as methanesulfonic acid ester, trichloromethanesulfonic acid ester, p-toluenesulfonic acid ester or the like.

Suitable salts of the carboxylic acid include, for example, metal salts such as sodium, potassium and silver salts, and quaternary ammonium salts of trialkylamines such as trimethylamine, triethylamine and the like.

Suitable solvents include, for example, benzene, toluene, xylene, acetone, methyl ethyl ketone, methyl isobutyl ketone, acetic acid, dimethyl formamide, dimethyl sulfoxide and the like.

In general, the reaction is effected at a temperature within the range of from room temperature to the boiling point of a solvent used depending on the kinds of reagents used.

In the method (g), a compound of the formula [XII] is reacted with an oxidizing agent in the presence of an inert solvent to yield a quinazolinone derivative of the formula [I].

Suitable oxidizing agents include, for example, potassium permanganate, sodium permanganate, manganese dioxide, magnesium oxide, sodium metaperiodate, and the like.

The solvent is preferably selected from the group consisting of benzene, toluene, ether, tetrahydrofuran, dioxane, chloroform, carbon tetrachloride, acetone, ethanol, isopropanol, dimethyl formamide, dimethyl sulfoxide, water and a mixture thereof.

The reaction can be effected with cooling or heating, depending upon the kinds of the oxidizing agent employed.

According to the process of the present invention, the following quinazolinone derivatives can, for example, be obtained.

1-Acetoxymethyl-4-phenyl-6-chloro-2(1H)-quinazolinone

1-Acetoxymethyl-4-phenyl-6-bromo-2(1H)-quinazolinone

1-Acetoxymethyl-4-phenyl-6-nitro-2(1H)-quinazolinone
1-Acetoxymethyl-4-(2-pyridyl)-6-chloro-2(1H)-quinazolinone
1-Isobutyryloxymethyl-4-phenyl-6-nitro-2(1H)-quinazolinone
1-Pivaloyloxymethyl-4-phenyl-6-nitro-2(1H)-quinazolinone
1-Methoxyacetoxymethyl-4-phenyl-6-nitro-2(1H)-quinazolinone
1-(2-Acetoxyethyl)-4-phenyl-2(1H)-quinazolinone
1-(2-Acetoxyethyl)-4-phenyl-6-chloro-2(1H)-quinazolinone
1-(2-Acetoxyethyl)-4-phenyl-7-chloro-2(1H)-quinazolinone
1-(2-Acetoxyethyl)-4-phenyl-6-bromo-2(1H)-quinazolinone
1-(2-Acetoxyethyl)-4-phenyl-8-bromo-2(1H)-quinazolinone
1-(2-Acetoxyethyl)-4-phenyl-6-methyl-2(1H)-quinazolinone
1-(2-Acetoxyethyl)-4-phenyl-6-methoxy-2(1H)-quinazolinone
1-(2-Acetoxyethyl)-4-phenyl-6,7-dimethoxy-2(1H)-quinazolinone
1-(2-Acetoxyethyl)-4-phenyl-6-nitro-2(1H)-quinazolinone
1-(2-Acetoxyethyl)-4-phenyl-8-nitro-2(1H)-quinazolinone
1-(2-Acetoxyethyl)-4-phenyl-6-trifluoromethyl-2(1H)-quinazolinone
1-(2-Acetoxyethyl)-4-phenyl-6-cyano-2(1H)-quinazolinone
1-(2-Acetoxyethyl)-4-phenyl-6-carbomethoxy-2(1H)-quinazolinone
1-(2-Acetoxyethyl)-4-phenyl-6-methylthio-2(1H)-quinazolinone
1-(2-Acetoxyethyl)-4-phenyl-6-methylsulfonyl-2(1H)-quinazolinone
1-(2-Acetoxyethyl)-4-phenyl-6,7-methylenedioxy-2(1H)-quinazolinone
1-(2-Acetoxyethyl)-4-(o-fluorophenyl)-6-chloro-2(1H)-quinazolinone
1-(2-Acetoxyethyl)-4-(o-chlorophenyl)-6-nitro-2(1H)-quinazolinone
1-(2-Acetoxyethyl)-4-(p-tolyl)-2(1H)-quinazolinone
1-(2-Acetoxyethyl)-4-(p-methoxyphenyl)-6-chloro-2(1H)-quinazolinone
1-(2-Acetoxyethyl)-4-cyclohexyl-6-nitro-2(1H)-quinazolinone
1-(2-Acetoxyethyl)-4-(2-pyridyl)-6-chloro-2(1H)-quinazolinone
1-(2-Acetoxyethyl)-4-(2-pyridyl)-6-bromo-2(1H)-quinazolinone
1-(2-Acetoxyethyl)-4-(2-pyridyl)-6-nitro-2(1H)-quinazolinone
1-(2-Acetoxyethyl)-4-(2-thienyl)-6-chloro-2(1H)-quinazolinone
1-(2-Acetoxyethyl)-4-(2-furyl)-6-nitro-2(1H)-quinazolinone
1-(2-Acetylthioethyl)-4-phenyl-6-nitro-2(1H)-quinazolinone
1-(2-Propionyloxyethyl)-4-phenyl-6-nitro-2(1H)-quinazolinone
1-(2-Isobutyryloxyethyl)-4-phenyl-6-nitro-2(1H)-quinazolinone
1-(2-Acryloyloxyethyl)-4-phenyl-6-nitro-2(1H)-quinazolinone
1-(2-Phenylacetoxyethyl)-4-phenyl-6-nitro-2(1H)-quinazolinone
1-(2-Fluoroacetoxyethyl)-4-phenyl-6-nitro-2(1H)-quinazolinone
1-(2-Dichloroacetoxyethyl)-4-phenyl-6-nitro-2(1H)-quinazolinone
1-(2-Trifluoroacetoxyethyl)-4-phenyl-6-nitro-2(1H)-quinazolinone
1-(2-Methoxyacetoxyethyl)-4-phenyl-6-nitro-2(1H)-quinazolinone
1-(2-Hydroxyacetoxyethyl)-4-phenyl-6-nitro-2(1H)-quinazolinone
1-(2-Mercaptoacetoxyethyl)-4-phenyl-6-nitro-2(1H)-quinazolinone
1-(2-Cyclopropanecarbonyloxyethyl)-4-phenyl-6-nitro-2(1H)-quinazolinone
1-(2-Cyclopentanecarbonyloxyethyl)-4-phenyl-6-nitro-2(1H)-quinazolinone
1-(2-Cyclohexanecarbonyloxyethyl)-4-phenyl-6-nitro-2(1H)-quinazolinone
1-(2-Dimethylcarbamoyloxyethyl)-4-phenyl-6-nitro-2(1H)-quinazolinone
1-(2-Diethylcarbamoyloxyethyl)-4-phenyl-6-nitro-2(1H)-quinazolinone
1-(2-Piperidinocarbonyloxyethyl)-4-phenyl-6-nitro-2(1H)-quinazolinone
1-(2-Pyrrolidinocarbonyloxyethyl)-4-phenyl-6-nitro-2(1H)-quinazolinone
1-(2-Morpholinocarbonyloxyethyl)-4-phenyl-6-nitro-2(1H)-quinazolinone
1-(2-Carbamoyloxyethyl)-4-phenyl-6-nitro-2(1H)-quinazolinone
1-(3-Acetoxypropyl)-4-phenyl-6-nitro-2(1H)-quinazolinone The following examples are given by way of illustration and are not intended to limit the scope of the invention.

EXAMPLE 1

To a suspension of 5.34 g of 4-phenyl-6-nitro-2(1H)-quinazolinone in 50 ml of dimethylformamide was added 1.02 g of 52% sodium hydride and the mixture was stirred at 55°C for 30 minutes. To the mixture was added 5.0 g of 2-chloroethyl acetate and the resulting mixture was stirred at 100°C for 6 hours. After cooling, the resulting mixture was poured into 250 ml of water and then extracted with chloroform. The extract was washed successively with dilute hydrochloric acid and water, and dried over anhydrous sodium sulfate. The solvent was removed by distillation under reduced pressure to give brown oily residue. The oily residue was adsorbed on silica gel column and eluted with chloroform to separate 2.6 g of 1-(2-acetoxyethyl)-4-phenyl-6-nitro-2(1H)-quinazolinone and 2.1 g of 2-(2-acetoxyethoxy)-4-phenyl-6-nitroquinazoline. Each recrystallized from a mixture of ethanol and chloroform, the former gave pale brown prisms having a melting point of 158.5°–159.5°C, and the latter gave yellow needles having a melting point of 140.5°–141.5°C.

EXAMPLE 2

Using a procedure similar to that described in Example 1, but replacing 4-phenyl-6-nitro-2(1H)-quinazolinone by 4-phenyl-6-chloro-2(1H)-quinazolinone, there were obtained 1-(2- acetoxyethyl)-4-phenyl-6-chloro-2(1H)-quinazolinone having a melting point of 139.5°–140°C and 2-(2-acetoxyethoxy)-4-phenyl-6-chloroquinazoline having a melting point of 115.5°–116.5°C.

EXAMPLE 3

Using a procedure similar to that described in Example 1, but replacing 4-phenyl-6-nitro-2(1H)-quinazolinone by 4-phenyl-6-methyl-2(1H)-quinazolinone, there were obtained 1-(2-acetoxyethyl)-4-phenyl-6-methyl-2(1H)-quinazolinone having a melting point of 122°–123°C and 2-(2-acetoxyethoxy)-4-phenyl-6-methylquinazoline having a melting point of 96.5°–97.5°C.

EXAMPLE 4

Using a procedure similar to that described in Example 1, but replacing 4-phenyl-6-nitro-2(1H)-quinazolinone by 4-phenyl-6-methoxy-2(1H)-quinazolinone, there were obtained 1-(2-acetoxyethyl)-4-phenyl-6-methoxy-2(1H)-quinazolinone having a melting point of 193°–194°C and 2-(2-acetoxyethoxy)-4-phenyl-6-methoxyquinazoline having a melting point of 98°–99°C.

EXAMPLE 5

Using a procedure similar to that described in Example 1, but replacing 4-phenyl-6-nitro-2(1H)-quinazolinone by 4-phenyl-6-bromo-2(1H)-quinazolinone, there were obtained 1-(2-acetoxyethyl)-4-phenyl-6-bromo-2(1H)-quinazolinone having a melting point of 155°–156°C and 2-(2-acetoxyethoxy)-4-phenyl-6-bromoquinazoline having a melting point of 119°–119.5°C.

EXAMPLE 6

Using a procedure similar to that described in Example 1, but replacing 4-phenyl-6-nitro-2(1H)-quinazolinone by 4-(2-pyridyl)-6-bromo-2(1H)-quinazolinone, there were obtained 1-(2-acetoxyethyl)-4-(2-pyridyl)-6-bromo-2(1H)-quinazolinone having a melting point of 140°–141°C and 2-(2-acetoxyethoxy)-4-(2-pyridyl)-6-bromoquinazoline having a melting point of 120°–121°C.

EXAMPLE 7

Using a procedure similar to that described in Example 1, but replacing 2-chloroethyl acetate by chloromethyl pivalate, there were obtained 1-pivaloyloxymethyl-4-phenyl-6-nitro-2(1H)-quinazolinone having a melting point of 181°–182°C and 2-pivaloyloxymethoxy-4-phenyl-6-nitroquinazoline having a melting point of 137°–138°C.

EXAMPLE 8

To a solution of 3.2 g of 2-(2-acetoxyethylamino)-5-chlorobenzophenone in 20 ml of glacial acetic acid was added 0.9 g of potassium cyanate and the mixture was stirred at 50°C for 20 hours. After cooling, the mixture was poured into 100 ml of ice water and extracted with chloroform. The extract was washed with water and dried over anhydrous sodium sulfate, and the solvent was removed by distillation under reduced pressure. The resulting residue was adsorbed on silica gel column and eluted with chloroform to separate 1-(2-acetoxyethyl)-4-phenyl-6-chloro-2(1H)-quinazolinone having a melting point of 139°–140°C.

EXAMPLE 9

To a stirred solution of 2.3 g of 2-[N-(2-acetoxyethyl)trichloroacetamido]-5-chlorobenzophenone in 30 ml of tertiary butanol was added 4.5 g of ammonium acetate in three portions during the course of reaction. The mixture was heated under reflux for 15 hours. After cooling, the reaction mixture was poured into cold water and extracted with chloroform. The extract was washed with water and dried over anhydrous sodium sulfate and the solvent was removed by distillation under reduced pressure. The resulting residue was adsorbed on silica gel column and eluted with chloroform to separate 1-(2-acetoxyethyl)-4-phenyl-6-chloro-2(1H)-quinazolinone having a melting point of 139°–140°C.

EXAMPLE 10

To a solution of 1.6 g of 2-(2-acetoxyethylamino)-5-nitrobenzophenonimine and 6 ml of triethylamine in 40 ml of benzene, 35 ml of a 10% benzene solution of phosgene was added dropwise at 5°–10°C with stirring. The resulting mixture was further stirred at room temperature for 1 hour and the solvent was removed by distillation under reduced pressure. To the resulting residue were added 50 ml of chloroform and 50 ml of a dilute aqueous sodium carbonate solution under cooling and the resulting mixture was well stirred. The chloroform layer was washed with water and dried over anhydrous sodium sulfate, and the solvent was removed by distillation under reduced pressure. The resulting residue was adsorbed on silica gel column and eluted with chloroform to obtain 1-(2-acetoxyethyl)-4-phenyl-6-nitro-2(1H)-quinazolinone having a melting point of 158°–159°C.

EXAMPLE 11

To a solution of 3.11 g of 1-(2-hydroxyethyl)-4-phenyl-6-nitro-2(1H)-quinazolinone in 100 ml of chloroform, 1.6 g of acetyl chloride and 2 g of triethylamine were added dropwise and the resulting mixture was refluxed for 3 hours. After cooling, the reaction mixture was washed with water and dried over anhydrous sodium sulfate, and the solvent was removed by distillation under reduced pressure. The resulting residue was crystallized from a mixture of ethanol and chloroform to give 1-(2-acetoxyethyl)-4-phenyl-6-nitro-2(1H)-quinazolinone having a melting point of 158.5°–159.5°C.

EXAMPLE 12

To a solution of 3.7 g of 1-(2-bromoethyl)-4-phenyl-6-nitro-2(1H)-quinazolinone in 50 ml of dimethyl formamide was added 2 g of potassium acetate, and the resulting mixture was stirred at 100°C for 2 hours. After cooling, the reaction mixture was poured into 300 ml of water and extracted with chloroform. The extract was washed with water and dried over anhydrous sodium sulfate, and the solvent was removed by distillation under reduced pressure. The resulting residue was crystallized from a mixture of ethanol and chloroform to give 1-(2-acetoxyethyl)-4-phenyl-6-nitro-2(1H)-quinazolinone having a melting point of 158°–159°C.

EXAMPLE 13

To a solution of 1.7 g of 1-(2-acetoxyethyl)-4-phenyl-6-methoxy-3,4-dihydro-2(1H)-quinazolinone in 40 ml of dioxane, a suspension of 0.8 g of potassium permanganate in 8 ml of water was added and the resulting mixture was stirred at room temperature for 1 hour. Then a few drops of formic acid was added to the reaction mixture and the stirring was continued for a while. After brown precipitate was filtered off, the filtrate was diluted with water and extracted with chloroform. The extract was washed with water and dried over anhydrous sodium sulfate, and the solvent was removed by distillation under reduced pressure. The resulting residue was recrystallized from ethanol to give 1-(2-acetoxyethyl)-4-phenyl-6-methoxy-2(1H)-quinazolinone having a melting point of 193°–194°C.

EXAMPLE 14

Using a procedure similar to that described in Example 11, but replacing acetyl chloride by cyclopropanecarboxylic acid chloride, there was obtained 1-(2-cyclopropanecarbonyloxyethyl)-4-phenyl-6-nitro-2(1H)-quinazolinone having a melting point of 163°–164.5°C.

EXAMPLE 15

Using a procedure similar to that described in Example 11, there were obtained the following quinazolinone derivatives;

1-(2-propionyloxyethyl)-4-phenyl-6-nitro-2(1H)-quinazolinone, m.p. 149°–150°C;
1-(2-isobutyryloxyethyl)-4-phenyl-6-nitro-2(1H)-quinazolinone, m.p. 150°–151°C;
1-(2-acryloyloxyethyl)-4-phenyl-6-nitro-2(1H)-quinazolinone, m.p. 141°–142°C;
1-(2-dichloroacetoxyethyl)-4-phenyl-6-nitro-2(1H)-quinazolinone, m.p. 176.5°–178°C; and
1-(2-methoxyacetoxyethyl)-4-phenyl-6-nitro-2(1H)-quinazolinone, m.p. 153.5°–154.5°C.

EXAMPLE 16

Using a procedure similar to that described in Example 1, but replacing 4-phenyl-6-nitro-2(1H)-quinazolinone by 4-phenyl-6-methylsulfonyl-2(1H)-quinazolinone, there were obtained 1-(2-acetoxyethyl)-4-phenyl-6-methylsulfonyl-2(1H)-quinazolinone, m.p. 172°–173°C and 2-acetoxyethoxy-4-phenyl-6-methylsulfonylquinazoline, m.p. 158°–159°C.

EXAMPLE 17

Using a procedure similar to that described in Example 12, but replacing 1-(2-bromoethyl)-4-phenyl-6-nitro-2(1H)-quinazolinone and potassium acetate by 1-(2-chloroethyl)-4-phenyl-6-nitro-2(1H)-quinazolinone and sodium glycolate, there was obtained 1-(2-hydroxyacetoxyethyl)-4-phenyl-6-nitro-2(1H)-quinazolinone, m.p. 209°–210°C.

EXAMPLE 18

To a solution of 2.0 g of 1-(2-hydroxyethyl)-4-phenyl-6-nitro-2(1H)-quinazolinone in 20 ml of dimethylformamide was added 0.31 g of 52% sodium hydride, and the mixture was stirred at room temperature for 1 hour. To the resulting mixture was added 2.62 g of diethylcarbamoyl chloride and the mixture was heated with stirring at 100°C for 3 hours. After cooling, the reaction mixture was poured into 100 ml of cold water and extracted with chloroform. The extract was washed with water and dried over anhydrous sodium sulfate, and the solvent was removed under pressure. The residue was chromatographed on silica gel using chloroform as an eluent to give 1-(2-diethylcarbamoyloxyethyl)-4-phenyl-6-nitro-2(1H)-quinazolinone. Recrystallization from ethanol gave colorless prisms having a melting point of 125°–126°C.

What is claimed is:

1. A quinazolinone derivative of the formula,

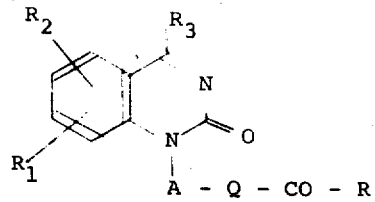

wherein $R_1$ and $R_2$ are independently hydrogen, halogen, lower alkyl, lower alkoxy, nitro, trifluoromethyl, cyano, lower alkoxycarbonyl, lower alkylthio or lower alkylsulfonyl; $R_3$ is phenyl, halophenyl, lower alkylphenyl, lower alkoxyphenyl, nitrophenyl, $C_{3-6}$ cycloalkyl, pyridyl, thienyl or furyl; R is lower alkyl, lower alkenyl, phenyl-lower alkyl, lower haloalkyl, lower alkoxyalkyl, lower hydroxyalkyl, lower mercaptoalkyl, $C_{3-6}$ cycloalkyl or ($C_{3-6}$ cycloalkyl)$C_{1-4}$ alkyl or a group of the formula

(wherein $R_4$ and $R_5$ are independently hydrogen or lower alkyl); Q is oxygen or sulfur; and A is lower alkylene.

2. A quinazolinone derivative of the formula,

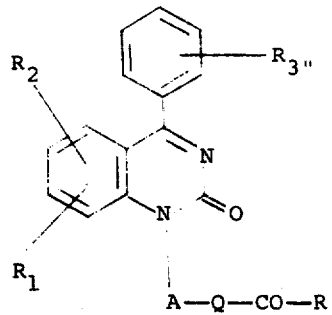

wherein $R_1$, $R_2$, R, Q and A are as defined in claim 1, and $R_{3''}$ is hydrogen, halogen, lower alkyl, lower alkoxy or nitro.

3. A quinazolinone derivative of the formula,

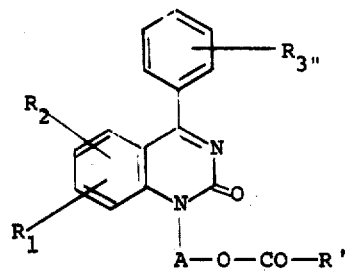

wherein $R_1$, $R_2$ and A are as defined in claim 1, $R_3$· is hydrogen, halogen, lower alkyl, lower alkoxy or nitro and R' is lower alkyl or lower alkenyl.

4. A quinazolinone derivative as in claim 3 wherein $R_3$· is hydrogen and R' is lower alkyl.

5. A quinazolinone derivative as in claim 1, wherein Q is an oxygen atom.

6. A quinazolinone derivative as in claim 2, wherein Q is an oxygen atom.

7. A quinazolinone derivative as in claim 5, wherein R is lower alkyl or lower alkenyl.

8. A compound of the formula,

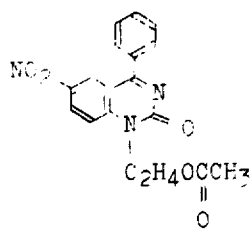

9. A compound of the formula,

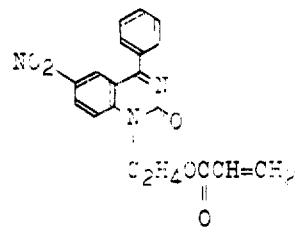

10. A compound of the formula,

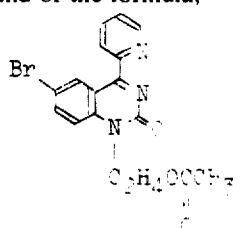

11. A compound of the formula,

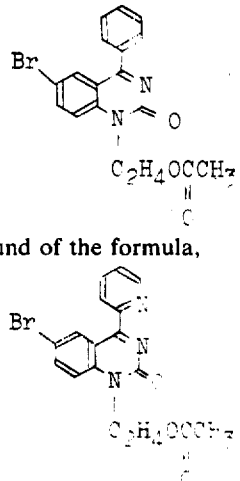

* * * * *